United States Patent [19]

Hackenberg et al.

[11] Patent Number: 5,200,603
[45] Date of Patent: Apr. 6, 1993

[54] SOURCE DISTANCE ADJUSTMENT ARRANGEMENT FOR UNIFORM ILLUMINATION OF PROJECTION SURFACE

[75] Inventors: Hubert Hackenberg, Holzkirchen; Traugott Liermann, Unterhaching; Hans-Joachim Schrecke, Grasbrunn, all of Fed. Rep. of Germany

[73] Assignee: Agfa-Gevaert AG, Leverkusen, Fed. Rep. of Germany

[21] Appl. No.: 872,635

[22] Filed: Apr. 22, 1992

[30] Foreign Application Priority Data

May 23, 1991 [DE] Fed. Rep. of Germany ....... 4116803

[51] Int. Cl.[5] ............................................. G01J 1/20
[52] U.S. Cl. ................................. 250/201.9; 355/68; 356/121

[58] Field of Search ............................ 250/208.2, 201.9; 356/121, 122, 123; 362/4; 355/68, 38

[56] References Cited

U.S. PATENT DOCUMENTS 4,746,958  5/1988  Yamakawa ............................ 355/68
5,091,744  2/1992  Omata ................................... 355/68

Primary Examiner—David C. Nelms
Assistant Examiner—K. Shami
Attorney, Agent, or Firm—Michael J. Striker

[57] ABSTRACT

A uniform illumination of the projection surface is obtained by measuring light intensity of a projection surface and adjusting a distance between a light source and an optical element in response to the measured light intensity to optimize brightness and/or distribution.

10 Claims, 1 Drawing Sheet

SOURCE DISTANCE ADJUSTMENT ARRANGEMENT FOR UNIFORM ILLUMINATION OF PROJECTION SURFACE

BACKGROUND OF THE INVENTION

The present invention relates to an arrangement for and a method of uniform illumination of a projection surface.

In particular, it relates to such an arrangement which has a light source and optical elements arranged between the light source and a projection surface wherein the distance between the light source and the optical elements is adjusted.

Arrangements of the above mentioned general type are known in the art. One of such arrangements is disclosed for example in the German document DE-OS 2,412,875. In this arrangement the user can change the position of the lamp relative to an optical system so that a maximum uniform illumination of the projection surface is obtained. This method however has the disadvantage in that the user must manually adjust the position of the light source and adjustment in addition depends on the subjective judgment of the user. With the use of alternating objectives with different focal distance or the zoom objectives with changing focal distances, a special adjustment of the illumination by the user is required for each focal distance. The adjustment requires a certain time or when the adjustment is maintained, a not satisfactory illumination of the projection surface is produced.

SUMMARY OF THE INVENTION

Accordingly, it is an object of the present invention to provide an arrangement for and a method of uniform illumination of a projection surface which avoids the disadvantages of the prior art.

In keeping with these objects and with others which will become apparent hereinafter, one feature of the present invention resides, briefly stated, in an arrangement for uniform illumination of a projection surface which has a measuring device which registers a light intensity occurring on the projection surface, and an adjusting device which adjusts the distance between the light source and the optical elements in dependence on the registered light intensity so that the brightness and/or the distribution is optimized.

Another object of the present invention is to provide a method of uniform illumination of a projection surface, in accordance with which a light intensity occurring on a projection surface is measured and then the distance between the light source and the optical element is adjusted in dependence on the registered light intensity so as to optimize the brightness and/or the distribution.

When the arrangement is designed and the method is performed in accordance with the present invention, the adjustment is performed not subjectively by a user. The measuring device first registers the light intensity occurring at the projection surface and then the adjustment of the distance between the light source and the optical element is performed in response to the registered intensity.

It has been shown that in many applications it is sufficient to measure the light intensity occurring at the projection surface only in one point of the projection surface, and then to change the distance between the light source and the optical element in dependence on this measuring value. This provides a fast adjustment of the lamp position when no significant brightness differences occur at the projection surface and only the maximum image brightness must be obtained.

In the cases when several objectives with significantly different focal distances are used which cause brightness differences resulting from the construction, it is advantageous in accordance with the present invention to determine the light intensity occurring at the projection surface at several different points of the projection surface. This is of course a little bit more time consuming than to measure in just one point. However, this option has the advantage that in the event of significant brightness on the projection surface, nevertheless the maximum image brightness is obtained.

In accordance with a further possible embodiment of the invention, the optimum illumination is performed with the same means but in a reverse process sequence. The distance between the light source and the optical elements is changed until the measuring device determines a maximum for the occurring light intensity. For this purpose a motor moves the light source along its adjusting region until the measuring device detects a maximum for the light intensity occurring on the projection surface, and then the movement of the light source is stopped.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically illustrating a method of and an arrangement for uniform illumination of a projection surface.

DESCRIPTION OF THE PREFERRED EMBODIMENTS

Figure 1:
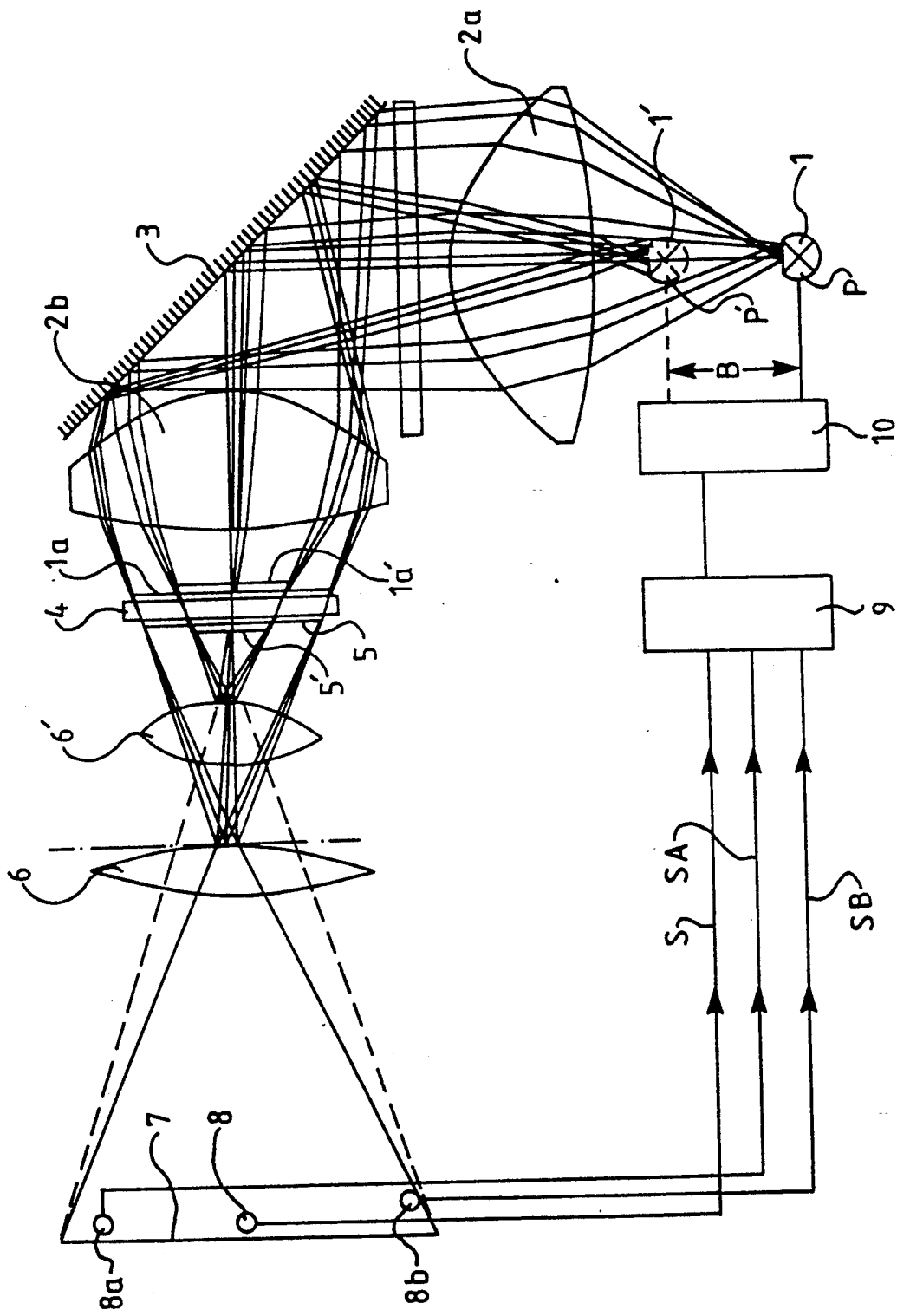

The single FIGURE shows schematically a path of rays from a light source through several optical element to a projection surface.

The light source is identified with reference numeral 1 and is movable between a first position P and a second position P'. The light rays extending from the light source 1 pass a first optical element 2a, then they are reflected on a mirror 3, then they extend through a second optical axis 2b and illuminate an image window 4 in which an image original 5 is located. A lens 6 reproduces the image original 5 on a projection surface 7. The length 6 or 6' has, depending on the size of the image original 5 or 5' another enlargment factor. Thereby image originals 5 or 5' with different sizes are reproduced on the projection surface 7 in a format-filling fashion. Brightness differences on the image window 4 are reproduced through the lens 6 on the projection surface 7.

The lines extending from the light source 1 illustrate the illumination radiation path which is varied with the distance of the light source from the optical elements. The light rays which extend from the light source 1 located in the position P illuminate the region 1a on the image window 4. The region 1a' illuminated on the image window 4 when the light source 1 is located in the position P is significantly different from the first mentioned region 1a. The illumination of smaller image regions 5' the position P' is selected. In the case of greater image regions 5 the position P is selected.

The goal of the invention is to illuminate the projection surface 7 in maximum uniform and bright fashion. For this purpose a sensor 8 is provided, to measure light intensity occurring on the projection surface 7 and to transmit the measurement results or the measurement signal to a control device 9. The control device 9 is connected with an electromechanical element 10, for example a stepper motor. The stepper motor changes the position of the light source 1 relative to the optical elements 2.

For providing the optimal illumination of the projection surface 7, the control device 9 acts on the electromechanical element 10 for changing the distance between the light source 1 and the optical elements 2a, 2b. The electromechanical element 10 can move the light source 1 within the adjusting region B. When the light source 1 is moved, the control device 9 registers the signals S supplied from the sensor 8. These signals change in dependence on the distance of the light source 1 from the optical elements 2. The signals 5 can be therefore described as a function of the distance of the light source 1 to the optical element 2. When a maximum for the signal S is reached, the control device 9 stops the electromechanical element 10 so that the position of the light source 1 is fixed. The recognition of the maximum is performed by a known electronic circuit in the control device 9.

In the practice, it can however happen that during movement of the light source 1 a local maximum of the signal S is reached. The absolute maximum for the signal S is however reached when the light source 1 is moved further. This absolute maximum for the signal S is not recognized in the above mentioned case since the control device 9 at the occurrence of the local maximum interrupts further movement of the light source 1. For this purpose it is provided that the light source 1 is to be moved over the total adjustment region E and the signals S occurring during this movement are stored in the control device 9. After passing the total adjustment region B, the absolute maximum is easily determined from the stored values of the signal S. Subsequently, the light source 1 is brought to the position in which the maximum for the signals S is reached.

The above mentioned procedure is used especially when the light intensity occurring on the projection surface 7 is measured not in one point, but in several points with several measuring sensors, and then a computer must determine such a position which produces the optimum illumination of the projection surface 7. In this case the measuring values S, SA, SB from the sensors 8, 8a, 8b are determined in a control device 9 which is a part of a measuring device while the light source 1 is moved over the adjustment region B.

When the signals S, SA, SB stored in the control device 9, then with consideration of different criteria such as for example maximum average brightness or minimum brightness differences on the projection surface 7, the suitable distance of the light source 1 from the optical element 2 is determined.

It will be understood that each of the elements described above, or two or more together, may also find a useful application in other types of constructions and methods differing from the types described above.

While the invention has been illustrated and described as embodied in an arrangement for and a method of uniform illumination of a projection surface, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of uniform illumination of a projection surface with a light source and an optical element located between the light source and the projection surface, comprising the steps of measuring a light intensity on a projection surface; and adjusting a distance between a light source and the optical element in dependence on the measured light intensity on the projection surface so as to optimize at least one of brightness and distribution.

2. A method as defined in claim 1, wherein said adjusting includes adjusting the distance so as to optimize both brightness and distribution.

3. A method as defined in claim 1, wherein said measuring includes measuring light intensity only in one point on the projection surface which serves as a reference point.

4. A method as defined in claim 1, wherein said measuring includes measuring light intensity at several points on the projection surface.

5. A method as defined in claim 1, wherein said adjusting includes adjusting the distance between the light source and the optical element until an optimum for the light intensity is determined by the measuring.

6. An arrangement for uniform illumination of a projection surface, comprising a light source; an optical element located between said light source and a projection surface; means for measuring light intensity on the projection surface; and means for adjusting a distance between said light source and said optical element in dependence on the measured light intensity so as to optimize at least one of brightness and distribution.

7. An arrangement as defined in claim 6, wherein said adjusting means is formed so as to adjust the distance to optimize both the brightness and distribution.

8. An arrangement as defined in claim 6, wherein said measuring means is formed so as to measure the light intensity of the projection surface only in one point which serves as a reference point.

9. An arrangement as defined in claim 6, wherein said measuring means is formed so as to measure the light intensity of the projection surface in several points.

10. An arrangement as defined in claim 6, wherein said adjusting means is formed so as to adjust the distance between said light source and said optical element until said measuring means determine an optimum for the light intensity.

* * * * *